US012561464B2

(12) United States Patent
Brown

(10) Patent No.: US 12,561,464 B2
(45) Date of Patent: Feb. 24, 2026

(54) CATALYST 4 CONNECTIONS

(71) Applicant: Technology Natives, LLC, Clearwater, FL (US)

(72) Inventor: Jessie Brown, Dunedin, FL (US)

(73) Assignee: Technology Natives, LLC, Clearwater, FL (US)

( * ) Notice: Subject to any disclaimer, the term of this patent is extended or adjusted under 35 U.S.C. 154(b) by 856 days.

(21) Appl. No.: 17/664,499

(22) Filed: May 23, 2022

(65) Prior Publication Data

US 2023/0067963 A1     Mar. 2, 2023

Related U.S. Application Data

(60) Provisional application No. 63/194,374, filed on May 28, 2021.

(51) Int. Cl.
G06F 21/62     (2013.01)
G06F 16/248     (2019.01)
G06N 20/00     (2019.01)

(52) U.S. Cl.
CPC ........ G06F 21/6218 (2013.01); G06F 16/248 (2019.01); G06N 20/00 (2019.01)

(58) Field of Classification Search
CPC ........................... G06F 21/6218; G06N 20/00
See application file for complete search history.

(56) References Cited

U.S. PATENT DOCUMENTS

| | | | | |
|---|---|---|---|---|
| 9,053,198 | B2 * | 6/2015 | Harrison | ............ G06F 16/9554 |
| 10,395,214 | B2 * | 8/2019 | DeVincent | ........... G06Q 10/101 |
| 11,245,947 | B1 * | 2/2022 | Sabo | ............... H04N 21/25841 |
| 11,404,170 | B2 | 8/2022 | Charlap | |
| 2009/0112625 | A1 * | 4/2009 | Doherty | ................. G06Q 30/02 |
| | | | | 705/3 |
| 2009/0118588 | A1 * | 5/2009 | Robinson | ................. A61B 5/16 |
| | | | | 600/300 |
| 2014/0374474 | A1 * | 12/2014 | Huang | ............... G06Q 30/0281 |
| | | | | 235/375 |
| 2021/0151158 | A1 * | 5/2021 | Powell | ................... G16H 70/40 |
| 2021/0313041 | A1 * | 10/2021 | Keene | ................... G16H 40/67 |

* cited by examiner

*Primary Examiner* — Beau D Spratt
(74) *Attorney, Agent, or Firm* — Older and Lundy LLC; Thomas Stanton; Eric Kleinertz

(57)     ABSTRACT

The invention relates to a system used to enhance the senior living experience by helping the care provider. The system allows the family of the patient to capture relevant life information comprised of short videos.

5 Claims, 16 Drawing Sheets

301

311

401

410

1) He loves sports.

He used to play football and baseball. If you want to start a conversation with him, chat about anything baseball, football or basketball.

420

402

421

2) He coached youth sports for 45 years.

After his playing career, he ran Tom Brown's Rookie League. He coached kids ages 5–13 in baseball, basketball, and flag football.

422

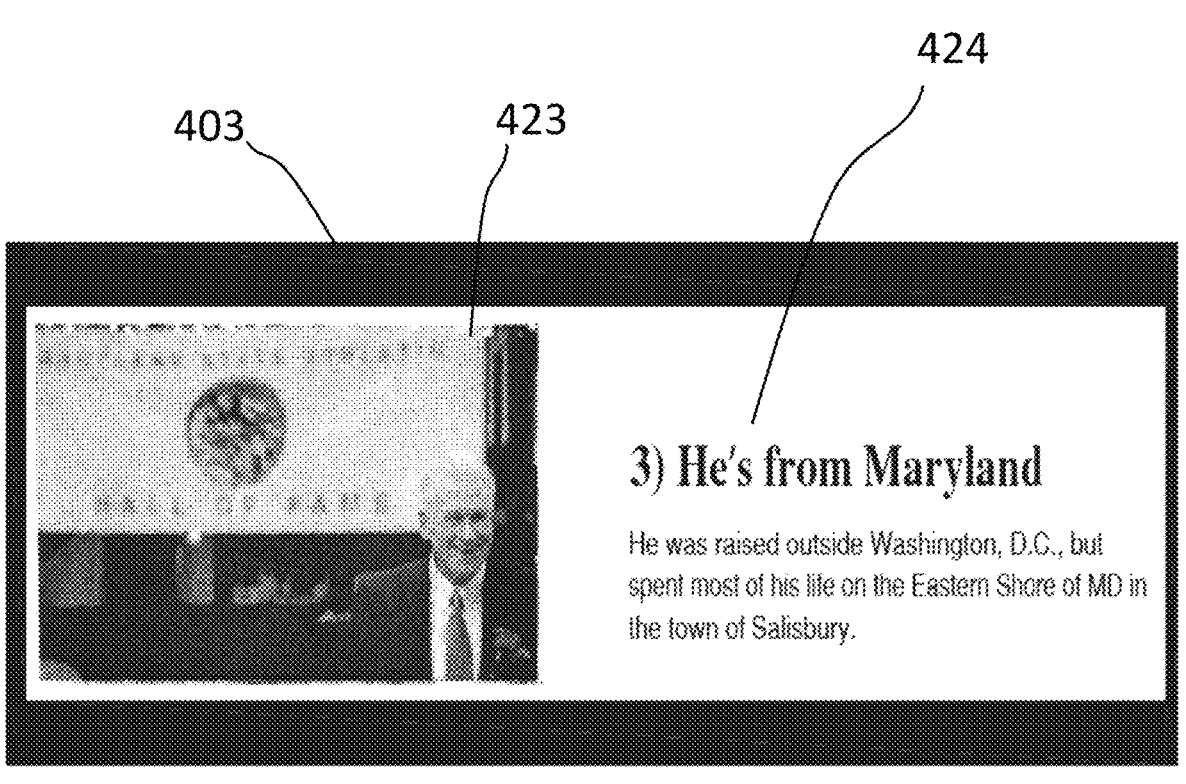
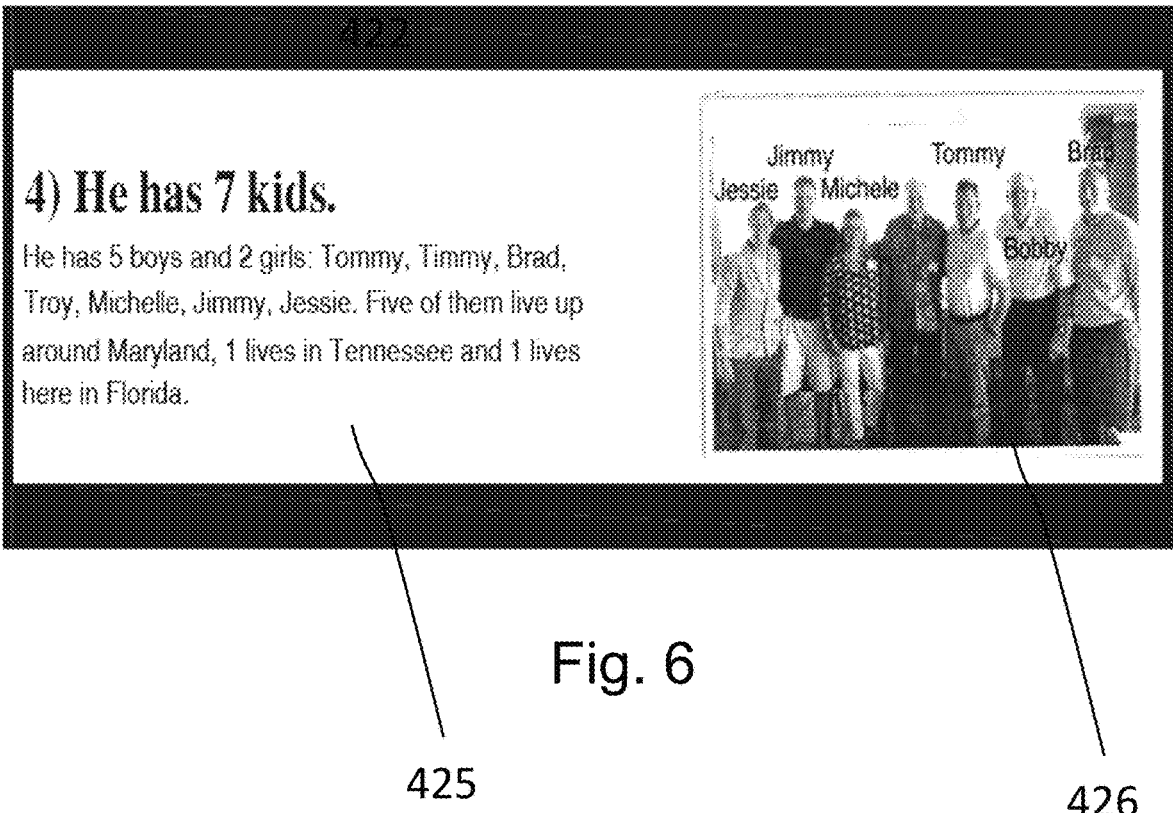
Fig. 6

404        427            428

429

404       430

501

511

502       503             504

Valerie was born in Chillicothe, Ohio. Her dad, Jim, owned an old-fashioned soda fountain and pharmacy.

She's lived in Colorado, West Virginia and New York. And Florida three times!

She was an avid reader and a member of several book clubs. She loved sewing including quilting, and she loves world travel.

Valerie has been an active volunteer throughout her life. She volunteered with homeless and with hospice families.

Fig. 10

505      506      507
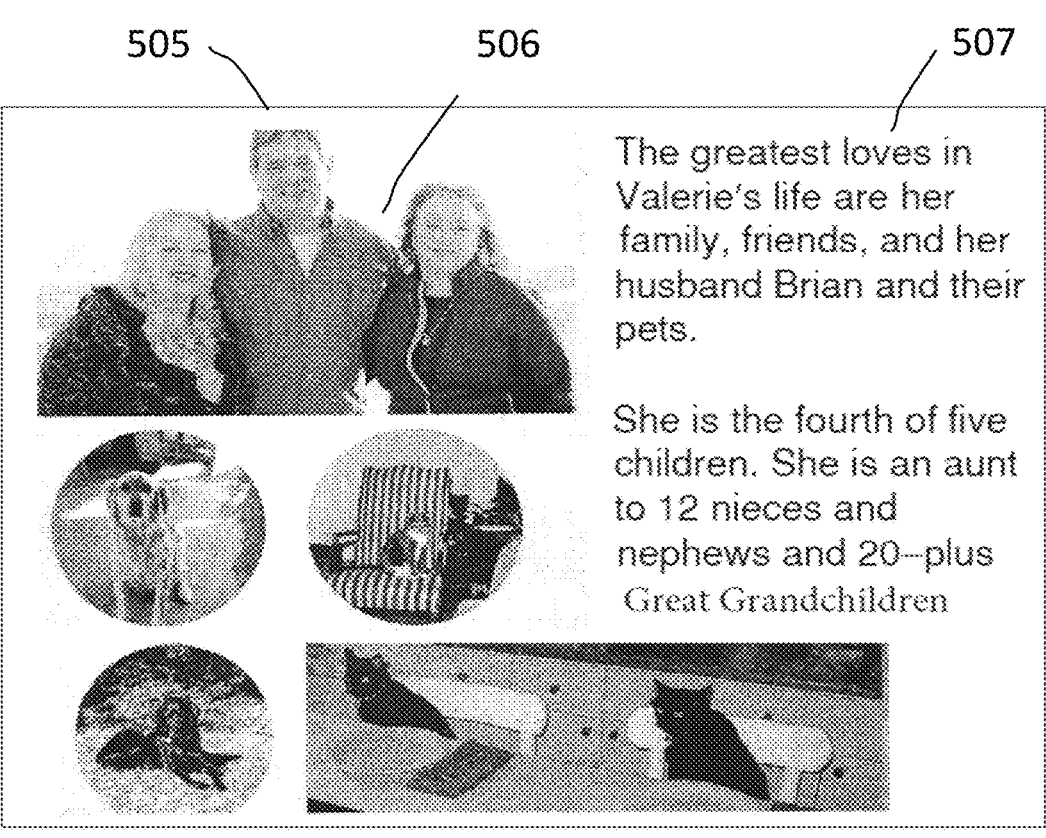
The greatest loves in Valerie's life are her family, friends, and her husband Brian and their pets.
She is the fourth of five children. She is an aunt to 12 nieces and nephews and 20-plus Great Grandchildren
She and Brian celebrate their 40th wedding anniversary on May 16, 2021.
509
508
Fig. 11

510
511
512
Valerie earned a Bachelor's Degree from USF and a Master's in Counseling at Miami University of Ohio (where she met Brian!)
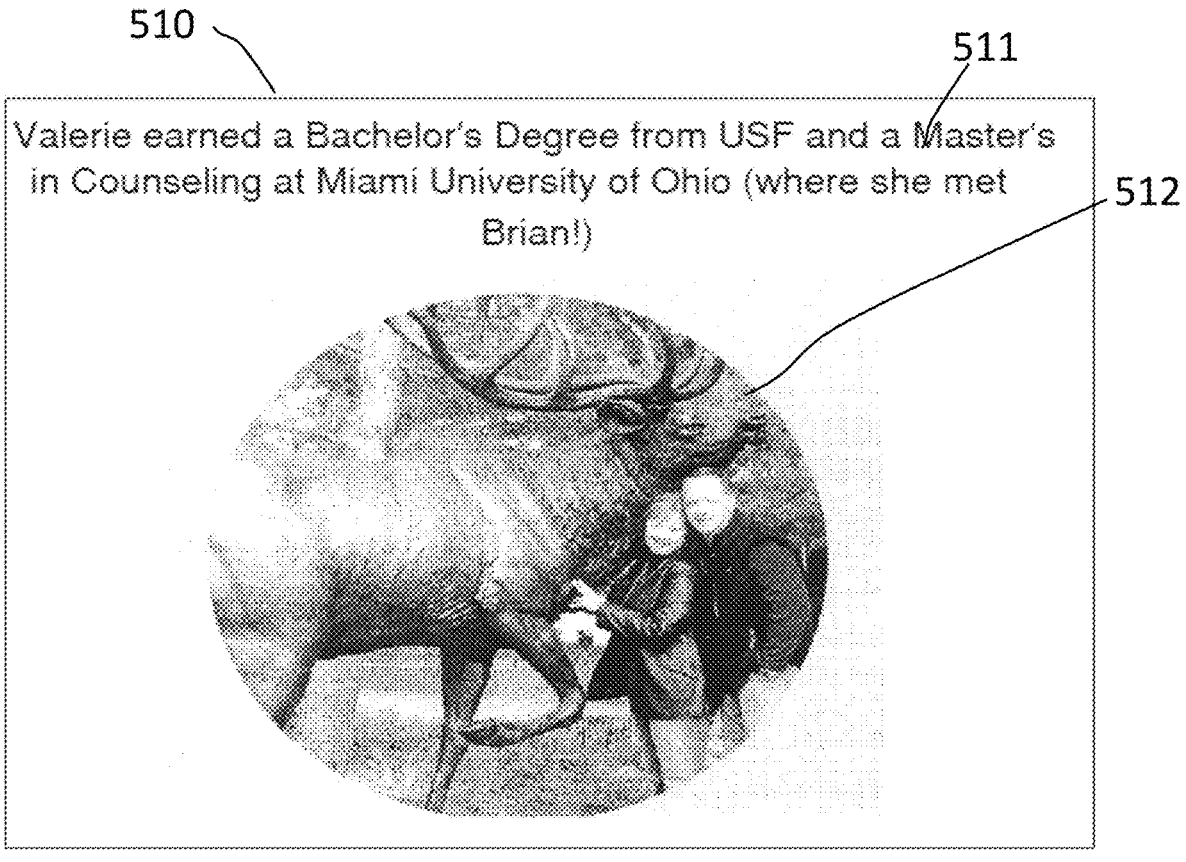
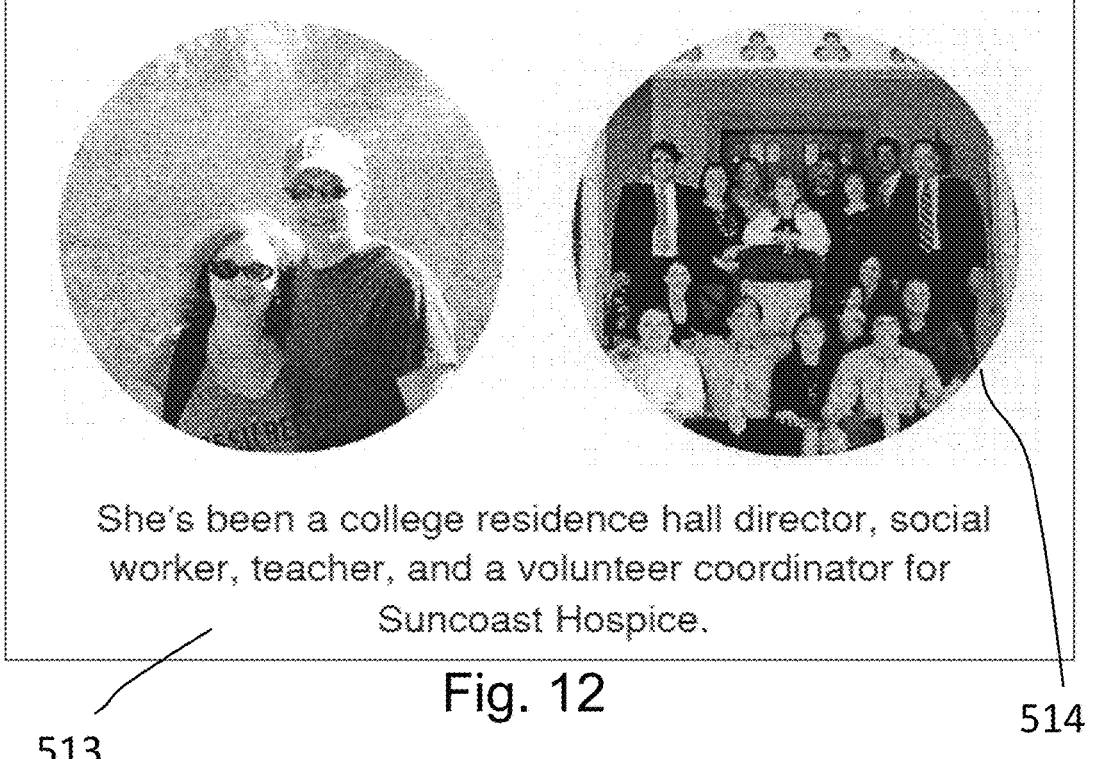
She's been a college residence hall director, social worker, teacher, and a volunteer coordinator for Suncoast Hospice.
513
514
Fig. 12

515                  516             517
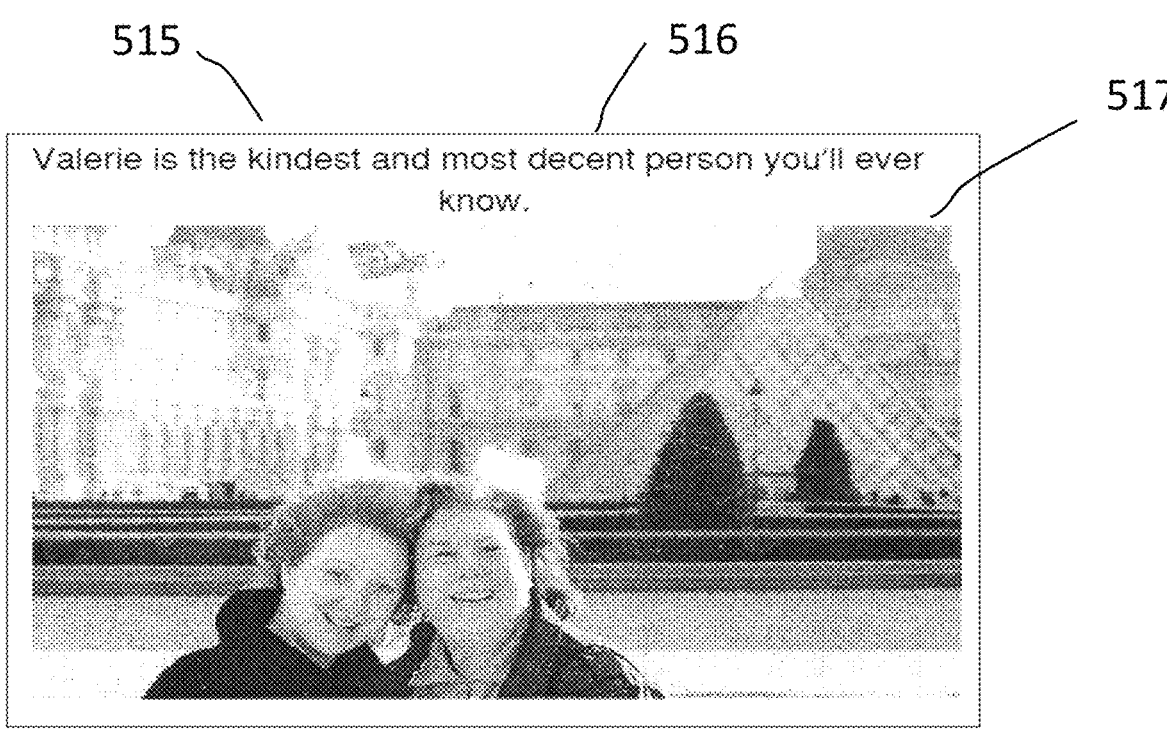
Valerie is the kindest and most decent person you'll ever know.
She has no tolerance for meaness or prejudice.
519                          518
Fig. 13

523

524

Catalyst & Connections

New

Video

Alert

Scan to learn all about Tom

Meet Tom Ballinger
● Served in the Army
● Has 2 daughters Lynn and Beth
  & 2 step daughters (Kim and Jill)
● Is a master gardener
● Likes watching sports on TV and
  Looking at pictures from home

525

210

210     535     536

Scan to learn
all about Tom

Meet
Tom Ballinger

1) Served in the Army
2) Has 2 daughters Lynn and Beth
   & 2 step daughters (Kim and Jill)
3) Is a master gardener
4) Likes watching sports
5) Loves animals and nature

537

CATALYST 4 CONNECTIONS

CROSS-REFERENCE TO RELATED APPLICATIONS

This application claims the benefit of U.S. Provisional Patent Application No. 63/194,374, filed on May 28, 2021, which is incorporated by reference herein in its entirety

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention and the applicants make no claim to any trademarks referenced.

BACKGROUND OF THE INVENTION

1) Field of the Invention

The invention relates a system used to enhance the senior living experience by helping the care provider. The system allows the family of the patient to capture relevant life information in the form of short videos.

2) Description of Related Art

Currently the state of the art includes information that is captured during the admission process, which is limited to notes and forms processed by the admitting personnel. This information is difficult to provide to the health care providers who are caring for the patient. This problem is exacerbated when the patient is suffering from dementia or Alzheimer's.

However, the current systems do not provide a method to capture and easily transmit information to the caregiver staff because they are paper and formed based data collection systems which require the care giver to read and remember the information about the patient.

Other existing systems include Electronic Health Record (EHR) systems and paper-based processes that are not automated. These systems rely on staff to enter the relevant information. This requires a number of manual tasks to achieve the inputting of the patient information.

Other systems which can provide information to the caregiving staff include:

Well.bi-https://www.welbi.co/

Cubigo-https://www.cubigo.com/en

Sensei-https://www.sensi.ai/

Therefore, what is needed in the art is a system to help loved ones capture patient information so that it is available to caregiving staff.

BRIEF SUMMARY OF THE INVENTION

The instant invention in one form is directed to a system that creates short videos, set to music. The videos contain information about residents or patients in a Nursing facility, Hospital, Assisted Living Facilities (ALF) or Independent Living Facility (ILF). These videos are then placed in a data repository such as an eBook and can be associated with a Quick Response (QR) code or an electronic tag so that it can be readily available to staff of the Assisted Living Facilities.

The videos can then be shared with caregivers, family members, qualified individuals such as physicians and therapist and staff at the facility so as to facilitate the development of deeper connections between the staff, caregiver, and patient.

The information contained within these videos can be mined to provide the facility a view of the trends within their population. For instance, the data about their clients may indicate that 95% of the residents are parents, 10 are from Maryland or 75% loved to travel. This information can be used by the facility to schedule programs centered around resident interests. The system can also make informational videos about the staff members. This provides a significant benefit to the community in that it allows the family members of patients to get to know who is caring for their loved one, creating a deeper connection and a community encompassing the client/patient, caregivers, staff and family of the client/patient.

Additionally, quizzes on the information in the short videos are created and distributed to staff. The system applies a gamification process using the quizzes which further increases the involvement of the caregiving staff. The quizzes give the staff an opportunity to demonstrate understanding of their residents and attain different levels within the program which demonstrate greater understanding of the patients under their care. Ultimately, the more quizzes a caregiver passes, the higher level they attain. The levels are linked to various reinforcers. An alternative reward can be supplied by the patient's family or the facility. The rewards incentivizes the staff for reviewing the videos and taking the quizzes. These rewards can be simple low cost rewards, such as a donut or cup of coffee or time off or other corporate reward such as a parking place.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 6 shows second alternative typical information page of the video of the instant invention;

FIG. 10 shows a fourth alternative typical information page of the video of the instant invention;

FIG. 11 shows a fifth alternative typical information page of the video of the instant invention;

FIG. 12 shows a sixth alternative typical information page of the video of the instant invention;

FIG. 13 shows a seventh alternative typical information page of the video of the instant invention;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
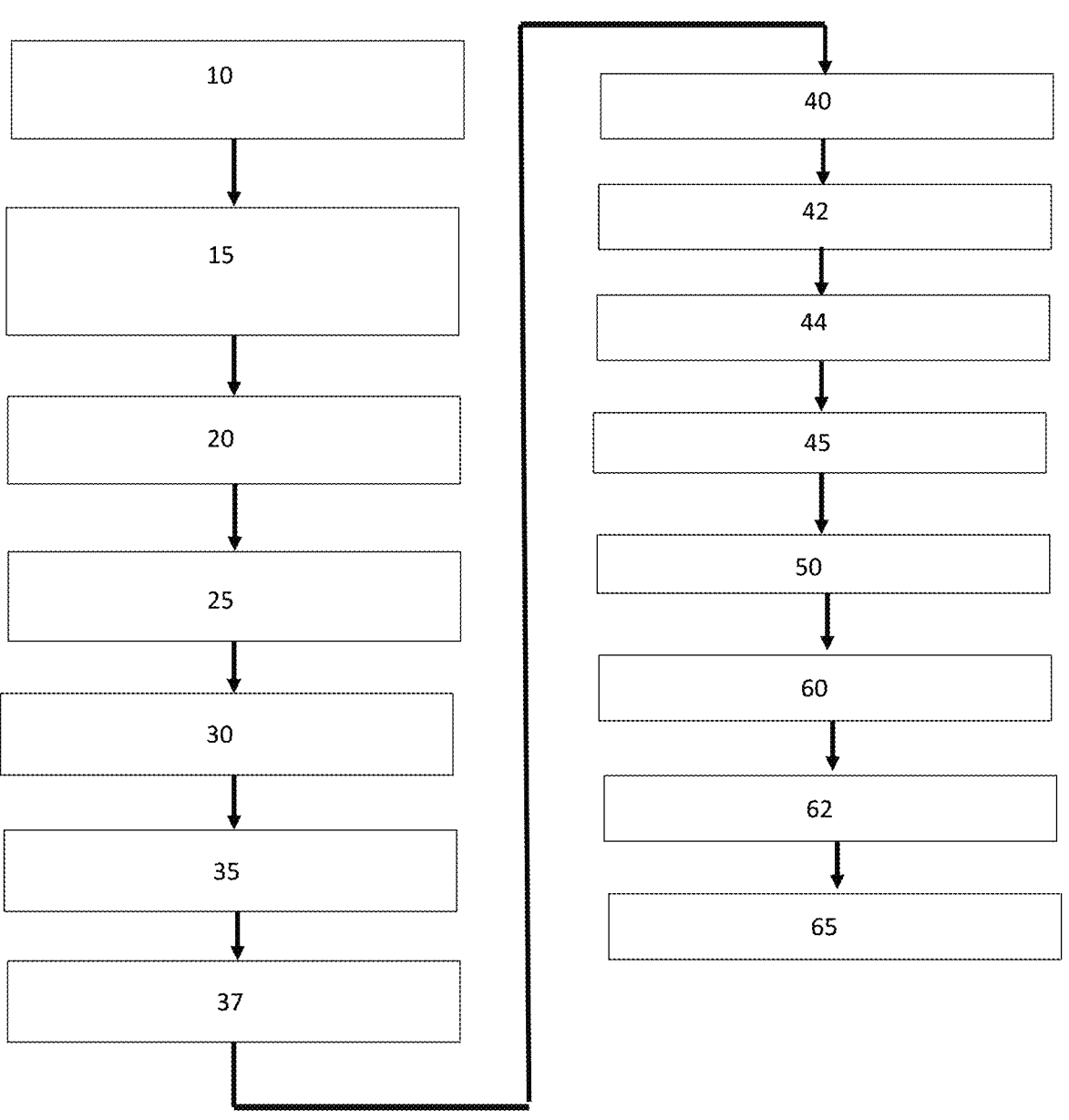
FIG. 1 is a flow chart of the instant invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The use of the term community, facility, senior living community, care facility, nursing facility, nursing home, hospital, independent living facility and assisted living facility are used interchangeably and are meant to mean a facility where individuals live under a common management structure.

The use of the term application or app as used within the specification is used to mean a computer application, and such computer application can run on any smart device, a server or computer.

The use of the term resident, patient and individual is used interchangeably to refer to an individual living in a facility.

The use of the term staff, management, caregiver is used interchangeably and is used to mean any individual that works in the facility.

The use of the term resident video is used to mean any resident specific information store electronically and in digital or analog format and can take the form of a video, a presentation, a memo, a paper or photographs.

The use of the term system, instant invention, platform and process is used to mean any process or software system to capture information which is relevant to a patient.

The use of the term Tag as used in the specification can mean a Quick Response (QR) code, barcode, Blue tooth tag, RFID tag, WIFI tag, NFC tag or Zigbee tag or other electronic tag that is associated with the information. When using an electronic tag, the caregiver or other user would scan the tag associated with a patient or client using their caregiver application or administrator application and they would be directed to the appropriate video and materials. The electronic tag could be a wearable device or alternatively, it could be attached to the patients room or apartment. The tag could alternatively be on a sheet where the tag is associated with the patient or client name.

The instant invention is a system that creates short videos, set to music that contains information about residents in a community or facility such as an Assisted Living Facilities (ALF). These videos are then placed in a data repository, such as an eBook, and can be associated with a primary tag such as a Quick Response (QR) code, barcode or electronic tag that is associated with the information. For example, a patients room could have a QR code or electronic tag such as a RFID, WIFI tag, Bluetooth tag, NFC tag or Zigbee tag and if a caregiver wanted to know information about the patient then they could use the caregiver instant invention application and view the stored information associated with the tag. The electronic tags could be attached to the patients room or apartment. The tag could alternatively be on a sheet where the tag is associated with the patient of client name.

The system facilitates the presentation of the videos so that they can be readily available to staff of the community. The system provides a portal that allows the videos to be shared with caregivers, family members, and staff at the facility to facilitate the development of deeper connections between the staff, caregiver and the patient. Additionally, quizzes on the information in the short videos are created and distributed to staff so that the caregivers can demonstrate their knowledge of the various patients in their care.

The instant invention provides an increased security feature for the information stored in the instant invention. The advent of the Health Insurance Portability and Accountability Act of 1996 (HIPAA) which is a federal law that required the creation of national standards to protect sensitive patient health information from being disclosed without the patient's consent or knowledge means that patient sensitive information must be controlled. The instant invention utilizes a multi-tiered system to limit information release to unauthorized individuals The first method of limiting access is that system access is password protected. This limits the access to the files and videos to only those individuals who are provided individual logins and passwords. The system then requires increased security by comparing the Internet Protocol address. The Internet Protocol address (IP address) is a numerical label such as 192.0.2.1 that is connected to a computer network at the facility location.

Therefore, for a caregiver or administrator to log into the system and have access to the files and videos they have to log in from the facility which is verified by the IP. If the system determines that the IP address match the facility information and they have to have an authorized login user id and password the individual is allowed access. This limits the access to only those individuals with access to the facility and having access to the facility network.

The system provides a method to send information to qualified individuals such as family, physicians and therapist. The administrator can create a file which can be accessed by an access Tag which allows the recipient to view the information or video. The access Tag preferably an electronic tag such as is a Bluetooth tag, RFID tag, WIFI tag, NFC tag or Zigbee tag or other electronic tag that is associated with the information. However, the instant invention can us a Quick Response (QR) code that is associated with the information. The use of an electronic tag allows the tag to be read only using an electronic device which adds to the security of the information contained in the video. The file is contained behind a firewall that prevents the recipient of the Tag from accessing any data that is not associated with the Tag. Once the file and the Tag is created the administrator places the Tag in a secure transfer mechanism such as a secure file sharing application and sends a link to the qualified individual who can access the file by using the Tag. The access tag could be on a sheet where the tag is associated with the patient or client name.

The system uses and Artificial Intelligence (AI) process to process the information supplied by the patient and family as well as captured the information in the videos to create the quizzes for the staff. The quizzes support the gamification module of the instant invention which awards prizes for completing a quiz.

The system's gamification module applies a gamification process using the quizzes which further increases the involvement of the caregiving staff. The quizzes give the staff an opportunity to demonstrate understanding of their residents and reach different levels within the program. Ultimately, the more quizzes an individual passes, the higher the level they attain. The levels are linked to various reinforcers. An alternative reward can be supplied by the patient's family or the facility. The rewards are given to the staff for reviewing the videos and taking the quizzes. These rewards can be simple low cost rewards such as a donut or cup of coffee or time off or other corporate recognized reward.

The system grades the quizzes and ranks the staff based on the number of quizzes taken versus passed percentages. The staff is given reinforcers or prizes as the staff attains various levels of test taken versus test passed.

The videos are made with the "audience" in mind. They are short, simple videos that eliminate the need for caregivers to read paper questions, and answers from standard forms with the residents' biographies. Currently the information with regards to the patients is shared by the administrative staff using paper-based systems which the caregiving staff is required to review. This review is in most cases boring and time consuming. The instant invention solves this by creating videos which are short and informative so that the caregiving staff can rapidly acquire relevant information about a client or patient and use that information to improve the patient or client interaction and care.

The videos of the instant invention provide a mechanism that allows the information to be collected from the patient's family. The system uses information provided in a digital form and can capture text, audio, pictures and videos relevant to the patient to create an information video. The system adds music to the information videos so that the caregiver or administrator viewing the video does not lose interest in the video and is therefore not exposed to the patient information. The music increases the viewers retention of information. The system further increases the caregiver staff attention by utilizing an incentive program. The incentives are used to create an environment which promotes the staff participation through the awarding of prices for completing the information video associated quiz.

Connections between staff and clients/patients are made through shared stories. The problem arises when the patient cannot tell their story. So many residents in communities such as an assisted living facilities are unable to recall and/or tell stories about their life. The instant invention allows family members to share facts they want the caregivers to know about their loved one. Caregivers armed with this information are able to engage more residents in conversation, deescalate behaviors, and share experiences/things they have in common.

The instant invention captures the patient information by sending at least one link and preferably two links to the patient's family. The first link opens an electronic form or questionnaire which is designed to capture facts about the patient which would be of interest to the caregiving staff and help them with their daily interactions. The information captured in this step includes items such as relationships, marriage, children, home, education, military service, occupation and any other information that is relevant to provide the caregivers and administrators insight to a patient's life. The second link captures pictures and videos associated with the patient. This provides a unified repository for the data that the system can utilize to create the videos.

Historically, senior living communities such as assisted living facilities collect resident data using a paper based process and puts the information into binders for review by the caregiver staff. There is generally, a lack of standardization in how the data is collected within corporations and across the industry as a whole. Staff at senior living communities also utilize paper forms that they request the resident's family to fill out. The responses found in the forms, therefore, can be limited to the detail of the questions asked.

In many cases, the form or forms are sent home with a family member as part of the paperwork to be completed at, or prior to moving into the facility. Generally, the forms are returned with incomplete information if they are returned at all.

The forms once returned to the community, are filed using traditional paper-based office practices which make them difficult to access and impossible to access in real time. If a staff member wants to know any information on a specific resident or a group of residents, they have to search the paper based records for the information and, in many cases the specific information desired is missing. The current practices include:

a. writing with pen/pencil on paper;

b. typing information into a computer, tablet, or smartphone;

c. not collecting the data at all.

Frequently when data is collected in the paper form, the staff is asking the resident or family member a question and recording a response. For example, a staff member may ask the resident to "tell them about the patient's faith." In this example, the family member tells the staff member a great story about how their loved one came to their faith, but all that ends up on the form in a truncated note such as the resident is "Protestant." There is no capability to capture video or audio files which could be helpful to the caregivers or administrators.

The instant invention resolves the issues with respect to patient information and provides the caregiver and facility the following unique features and benefits:

a. Data Collection—data is collected using forms, pictures, audio and video recordings which eliminates the need for note taking. The instant invention uses Artificial Intelligence (AI) to transcribe the information and create a compact video which provides the administrators and caregivers with patient information from the patient's family. The electronic forms, audio and video files are collected automatically. The information is then integrated into a video and music file attached to the video so that the video and music files are synchronized.

b. The digital resident information videos—provide readily available information from a secure cloud server using either the instant invention mobile application or client application on a remote computing device application. The instant invention uses a primary tag and secure system which requires a Login and password plus an IP address to ensure that access to the information is controlled and limited to only authorized individuals. The primary Tag limits the access to the information to only those individuals that have the primary Tag and the UP address is the primary IP address of the facility so only those individuals log into the facility network can use and have the primary Tag can access the data.

c. The incentives that are provided depend upon the staff/facility. Some are tangible, some may be time off, etc. It all depends on what motivates the staff and what the facility or family is able/willing to provide.

d. The instant invention provides a means of providing limited information to physicians and therapist by utilizing a secure link and file sharing to pass an access Tag with the file location to the physicians or therapist.

The instant invention sends the primary contact family member an electronic form/questionnaire requesting information about the patient and a link for uploading video, pictures and audio content. The focus is to create a greater connection between staff and patients. This gives the family the ability to tell their loved ones stories when the patient is not able to do so themselves.

The instant invention then takes that information and creates a video which has audio overlaid over the video. The audio can be music, audio input from the family or even the patient's favorite music. The audio content can be selected by the family or facility management.

Typical information included in the videos consists of the patient's hobbies or activities during their life such a s sports or sewing, volunteer activities, occupation, place of birth or where they were raised and where they lived, family and children, education and service branch and information that is specific to these events, contact information so that the caregivers can ask specific questions and secure links to send any request or additional information.

The instant invention compiles all the residents' information into one database so that the caregivers and administrators can view all the patient stories in one secure location.

The instant invention also provides quizzes for the caregivers as a gamification activity. The caregivers take the quizzes and by doing so and passing them, they achieve different performance levels which can be incentivized by the facility administration or the families. The quizzes allow the caregivers to demonstrate their knowledge about the clients/patients they care for and the grading of the quizzes allows all the participants to see how they perform with regards to knowledge of the clients/patients they care for. For example, if the caregiver worked on the east wing second floor, they could see how their knowledge of the clients/patients compares to the other caregivers who work on the east wing second floor which creates a competition between the caregivers. The gamification provides rewards/prizes to the caregivers based on their client/patient knowledge which increases the competition between caregivers.

Caregivers armed with this information provided by the videos of the instant invention are able to engage residents in conversation, de-escalate behaviors, and share common experiences. In the end, the more connected a caregiver feels to a patient, the more empathy they feel towards the patient, which leads to greater care.

Referring now to the drawings, and more particularly to FIG. 1, there is shown a flow chart of the instant invention.

a. Step 10 the instant invention sends an email to family requesting information and pictures of the patient.

b. Step 15 the instant invention receives the information and pictures/videos of the patient.

c. Step 20 the instant invention creates a visual presentation of the information and pictures.

d. Step 25 the instant invention creates a video of the visual presentation.

e. Step 30 the instant invention creates the quiz.

f. Step 35 the instant invention uploads the video and quiz to the database.

g. Step 37 The administrator logs into the instant invention and assigns the facility and location information for the video.

h. Step 40 the facility administration defines the award for competing the quiz.

i. Step 42 The caregiver logs into the instant invention and the instant invention confirms the facility and location information of the caregiver and the compares it to the facility and location information of videos.

j. Step 44 The caregiver selects the patient video to be reviewed for the facility and location information.

k. Step 45 the caregiver reviews a patient's video.

l. Step 50 the caregiver takes the quiz.

m. Step 60 the instant invention grades the quiz and awards the incentive to the caregiver.

n. Step 62 the administrator creates a shared file for an authorized individual such as a physician or therapist and stores the shared file in a secure file sharing site and creates an access Tag that is associated with the file.

o. Step 65 the administrator shares the access Tag with the authorized individual such as a physician or therapist. The access Tag and secure file sharing site limits access by the authorized individual such as a physician or therapist to only the shared file.

Figure 2:
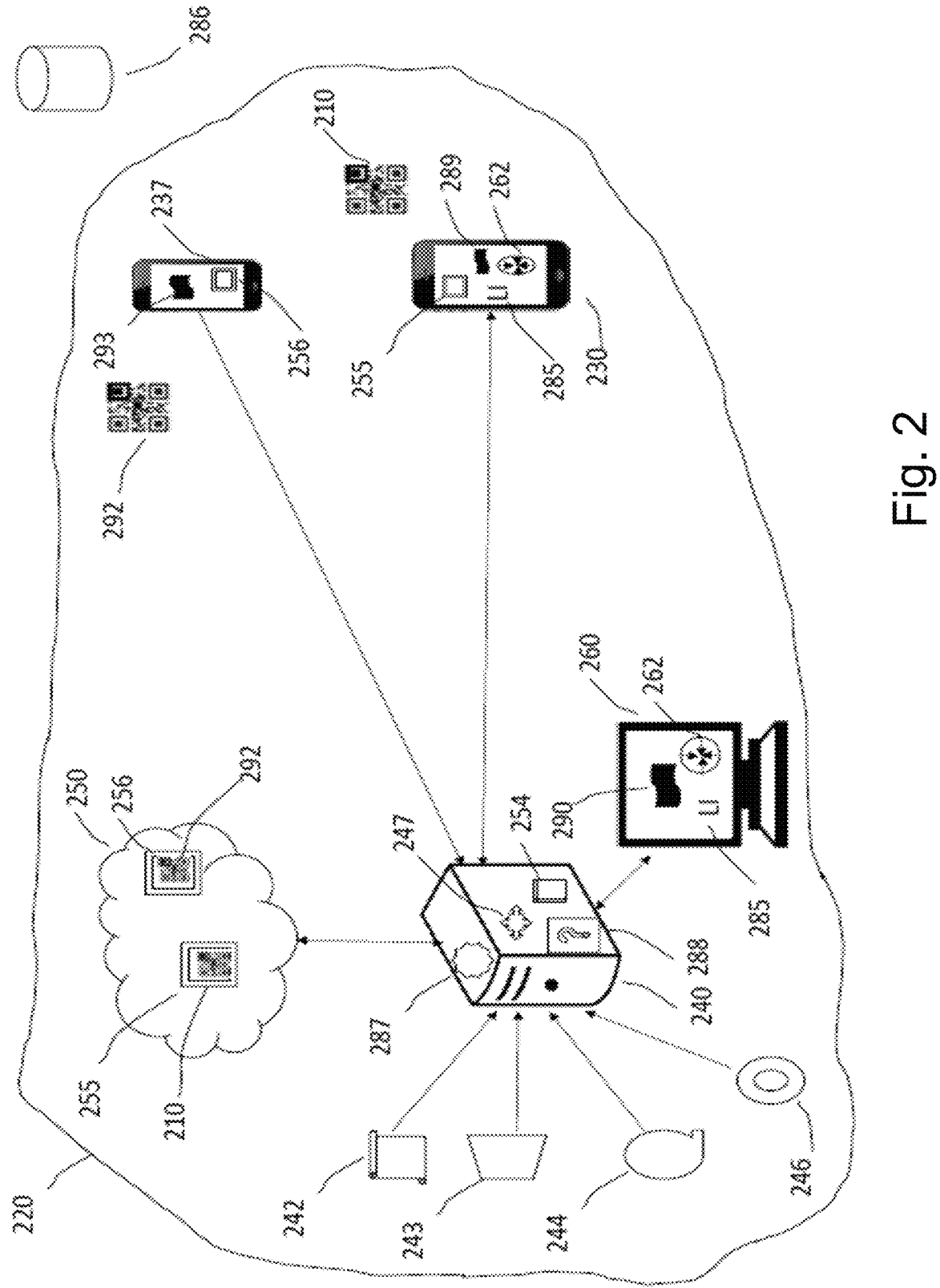
FIG. 2 shows a diagram of the instant invention.

Referring to FIG. 2 which shows the instant invention and the process of interacting with the primary Tag of the patient information and the method of sharing specific information with an authorized individual such as a physician or therapist using an access Tag. The primary Tag is preferably an electronic tag such as is a Bluetooth tag, RFID tag, WIFI tag, NFC tag or Zigbee tag or other peer to peer or peer to many communication protocols. However, any other electronic tag that is associated with the information can be used. The instant invention can also use a barcode or Quick Response (QR) code that is associated with the information. The system 220 sends a request for information to the primary family member who fills out the questionnaire 242 and returns questionnaire 242, audio files 243, pictures 246 and video files 244 to the server 240. The server 240 then creates a visual presentation 254 and a video 255 which is a compilation of presentation 254, questionnaire 242, audio files 243, pictures 246 and video files 244. The server 240 uses an Artificial Intelligence algorithm 247 or manual process to assemble the video 255 and add an audio track to the video 255 comprising of music. The Artificial Intelligence algorithm 247 utilizes typical page formats and sorts through the questionnaire 242, audio files 243, pictures 246 and video files 244 and extracts information which is loaded into the typical page formats of the visual presentation 254. The server 240 then uploads the video 255 to the cloud 250 and creates a primary Tag 210 and associates it with video 255.

The administrator logs into the workstation 260 using a secured login and password 285 and uses the workstation 260 to create quiz 288 and to assign the facility and location information 286 for the video 255. The administrator will define the award 287 for completing the quiz 288. The workstation 260 transmit the secured login and password 285, IP address 262 of the facility network and facility and location information 286 to the server 240 which verifies the security information comprising of the secured login and password 286, IP address 262 and if verified uploads the facility and location information 286 and award 287 for the video 255 to the cloud 250. The facility and location information 286, secured login and password 285 and IP address 222 are associated with the facility and therefore, act as an increase security method to verify the administrator or a caregiver. The workstation 260 can access the server 240 using an application 290 specially configured to access server 240 or a general purpose browser application.

The caregiver uses mobile device 230 to scan primary Tag 210 and mobile device 230 sends the primary Tag 210 information, secure login information 285 and IP address 262 to server 240 which retrieves video file 255 from the cloud 250 and displays it on mobile device 230. The mobile device 230 can access the server 240 using an application 289 specially configured to access server 240 or a general purpose browser application. The caregiver can view the video file 255 and take the quiz 288 and if completed successfully the instant invention awards an award 287 for competing the quiz. The caregiver can then review the scores of other caregivers to determine how they rank with respect to the other caregivers serving the same patients.

The administrator can then log into the workstation 260 using a secured login and password 285 and IP address 262 using workstation 260 and to create information video or file 256 to share with and authorized individual such as a physician or therapist and stores information video or file 256 in a secure file sharing site on the cloud 250 and associates it with an access Tag 292. The administrator sends the access Tag 292 to the authorized individual such as a physician or therapist who uses their mobile device 237 to access the access Tag 292 and view the associated information video or file 256. The mobile device 237 can access the server 240 using an application 293 specially configured to access server 240 or a general purpose browser application.

Figure 3:
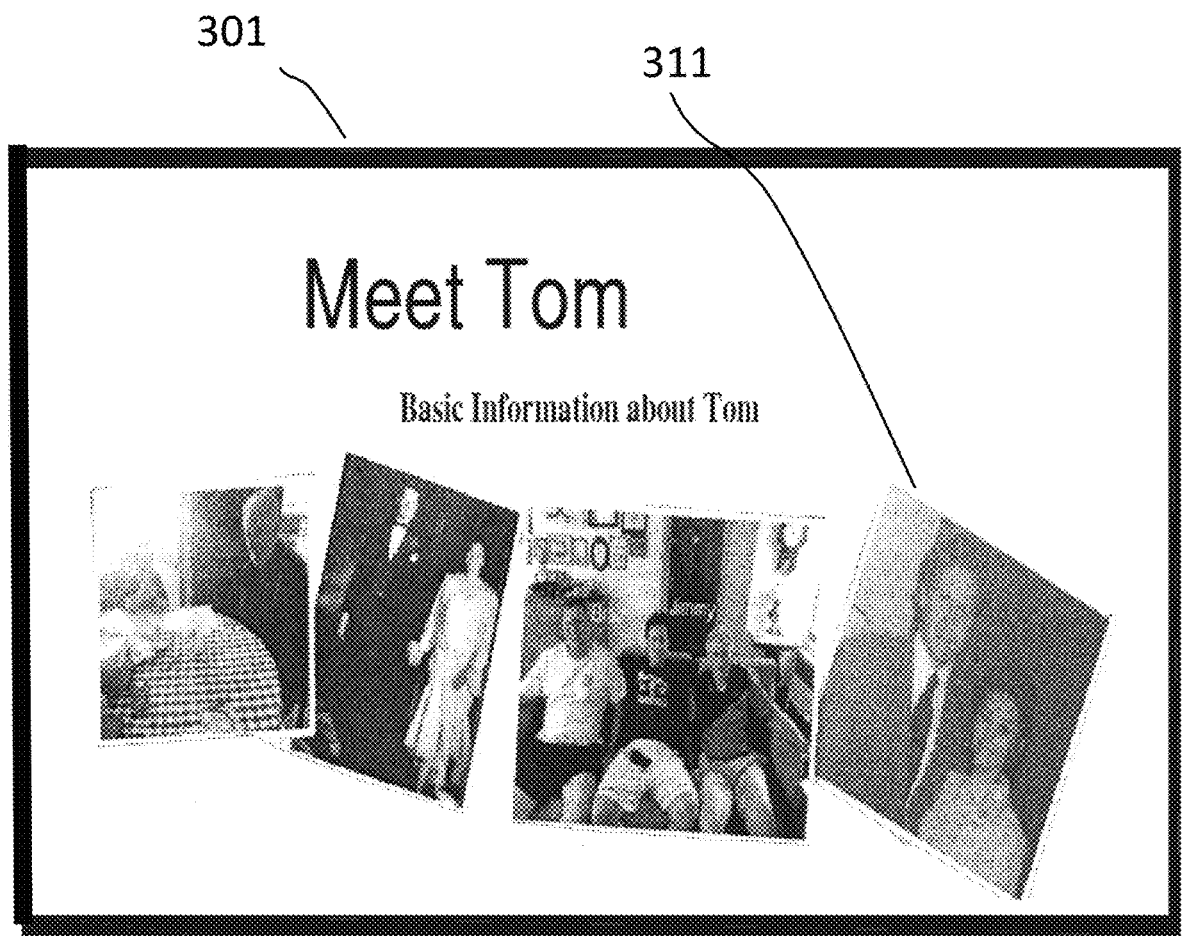
FIG. 3 shows a typical front page of the video of the instant invention.

FIG. 3 shows a typical front page 301 of the video 255 shown in FIG. 2 of the instant invention. The instant invention uses Artificial Intelligence algorithm 247 or manual process to assemble the visual presentation 254 and the video 255. The Artificial Intelligence algorithm 247 inserts the content 311 comprising of information from the questionnaire 242, audio files 243, pictures 246 and video files 244 into templates such as typical front page 301. The Artificial Intelligence algorithm 247 then assembles the video using links provided by the family member so that the proper questionnaire 242, audio files 243, pictures 246 and video files 244 shown in FIG. 2 are paired with the correct quiz 288. The questionnaire 242 can be a smart form which prompts the family member for information. For example, if the family member says that the patient was in the navy the smart form would ask questions such as: when, what was their rank, where did they serve, which ships or bases and years of service, what was their rank at discharge. The Artificial Intelligence algorithm 247 will then assemble this information into video 255.

Figure 4:
FIG. 4 shows a typical second page of the video of the instant invention.

FIG. 4 shows typical second information page 401 of the video 255 shown in FIG. 2 of the instant invention. The instant invention uses Artificial Intelligence algorithm 247 or manual process to assemble the visual presentation 254 and the video 255. The typical information page 401 of the video 255 shown in FIG. 2 shows a picture of the client/patient 410 and information 420 that relates to the client/patient.

Figure 5:
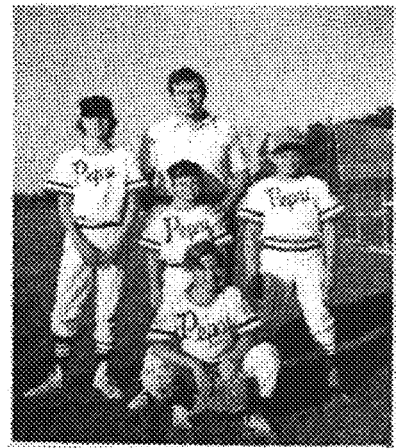
FIG. 5 shows first alternative typical information page of the video the instant invention.

FIG. 5 shows a first alternative typical information page 402 of the video 255 shown in FIG. 2 of the instant invention. The instant invention uses Artificial Intelligence algorithm 247 or manual process to assemble the visual presentation 254 and the video 255. The typical information page 402 of the video 255 shown in FIG. 2 shows a picture of the client/patient 421 and information 422 that relates to the client/patient.

FIG. 6 shows a second alternative typical information page 403 of the video 255 shown in FIG. 2 of the instant invention. The instant invention uses Artificial Intelligence algorithm 247 or manual process to assemble the visual presentation 254 and the video 255. The typical information page 403 of the video 255 shown in FIG. 2 shows a picture of the client/patient 423 and 426 and information 423 and 425 that relates to the client/patient.

Figure 7:
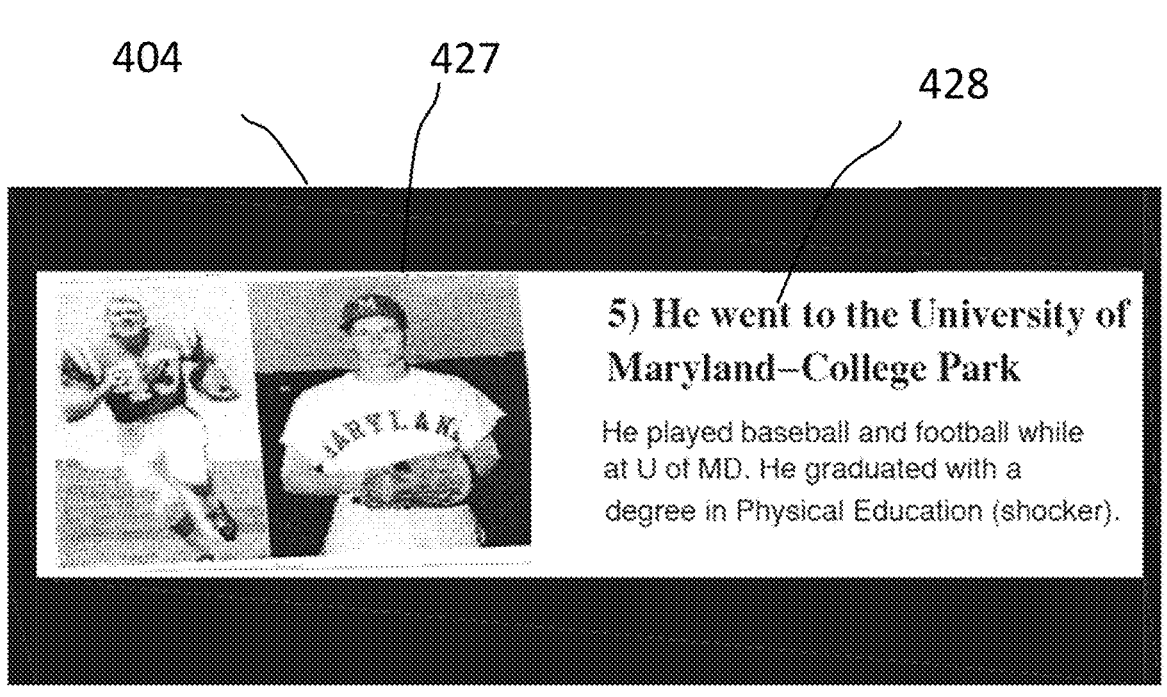
FIG. 7 shows a third alternative typical information page of the video of the instant invention.

FIG. 7 shows a third alternative typical information page 404 of the video 255 shown in FIG. 2 of the instant invention. The instant invention uses Artificial Intelligence algorithm 247 or manual process to assemble the visual presentation 254 and the video 255. The typical information page 404 of the video 255 shown in FIG. 2 shows a picture of the client/patient 427 and information 428 that relates to the client/patient.

Figure 8:
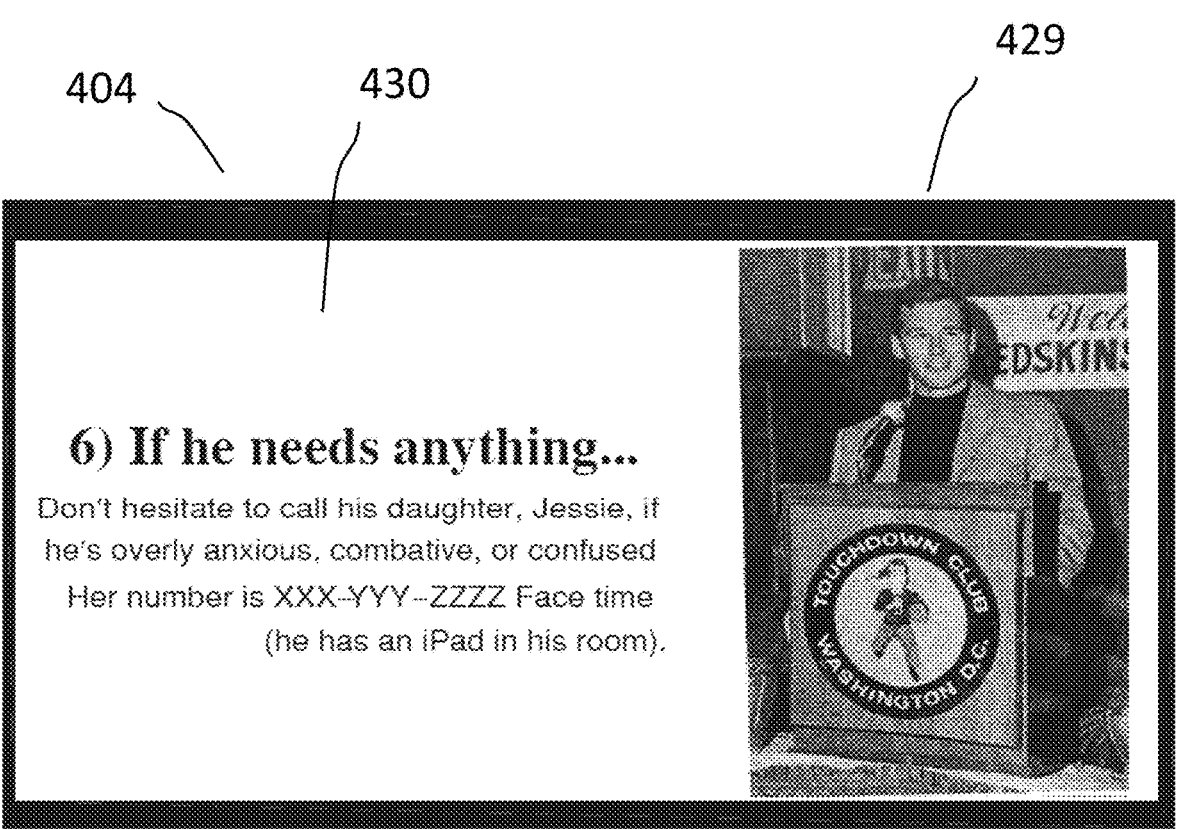
FIG. 8 shows a typical contact information page of the video of the instant invention.

FIG. 8 shows a typical contact information page 405 of the video 255 of the instant invention shown in FIG. 2. The instant invention uses Artificial Intelligence algorithm 247 or manual process to assemble the visual presentation 254 and the video 255. The typical information page 405 of the video 255 shown in FIG. 2 shows a picture of the client/patient 429 and information 430 that relates to the client/patient.

Figure 9:
FIG. 9 shows an alternative front page of the video of the instant invention.

FIG. 9 shows an alternative front page 501 of the video 255 of the instant invention. The instant invention uses Artificial Intelligence algorithm 247 or manual process to assemble the visual presentation 254 and the video 255. The instant invention uses Artificial Intelligence algorithm 247 or manual process to assemble the video 255 to insert the content 511 into templates such as typical front page 501.

FIG. 10 shows a fourth alternative typical alternative information page of the video 255 of the instant invention. The instant invention uses Artificial Intelligence algorithm 247 or manual process to assemble the visual presentation 254 and the video 255. The typical alternative information page 502 of the video 255 shown in FIG. 2 shows a picture of the client/patient 503 and information 504 that relates to the client/patient.

FIG. 11 shows a fifth alternative typical alternative information pages of the video 255 of the instant invention. The instant invention uses Artificial Intelligence algorithm 247 or manual process to assemble the visual presentation 254 and the video 255. The typical alternative information page 505 of the video 255 shown in FIG. 2 shows a picture of the client/patient 506 and 508 and information 507 and 509 that relates to the client/patient.

FIG. 12 shows a sixth alternative typical alternative information page of the video 255 of the instant invention. The instant invention uses Artificial Intelligence algorithm 247 or manual process to assemble the visual presentation 254 and the video 255. The typical alternative information page 510 of the video 255 shown in FIG. 2 shows a picture of the client/patient 512 and 514 and information 511 and 513 that relates to the client/patient.

FIG. 13 shows a seventh alternative typical alternative information page 515 of the video 255 of the instant invention. The instant invention uses Artificial Intelligence algorithm 247 or manual process to assemble the visual presentation 254 and the video 255. The typical alternative information page 515 of the video 255 shown in FIG. 2 shows a picture of the client/patient 516 and 518 and information 519 and 517 that relates to the client/patient.

Figure 14:
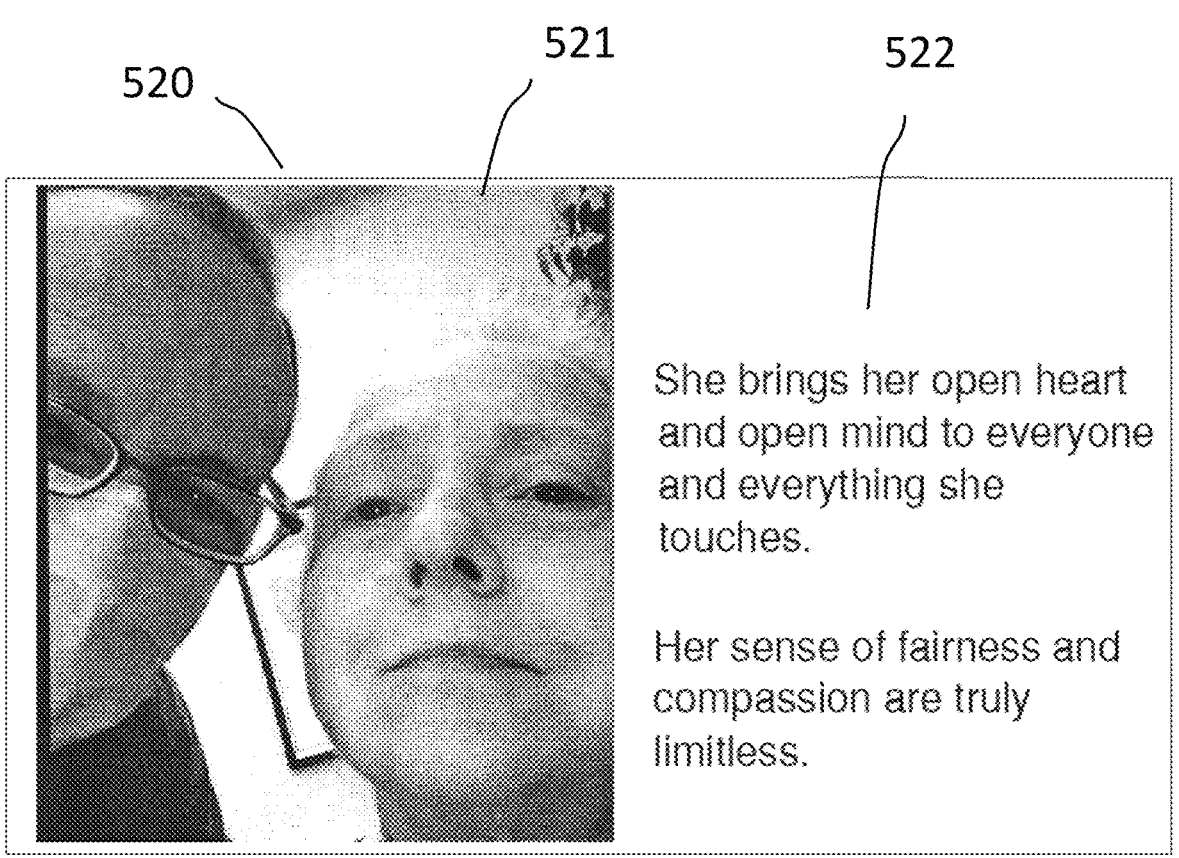
FIG. 14 shows an eighth alternative typical alternative information page of the video of the instant invention.

FIG. 14 shows an eighth alternative typical alternative information page 520 of the video 255 of the instant invention. The instant invention uses Artificial Intelligence algorithm 247 or manual process to assemble the visual presentation 254 and the video 255. The typical alternative information page 520 of the video 255 shown in FIG. 2 shows a picture of the client/patient 521 and information 522 that relates to the client/patient.

Figure 15:
FIG. 15 shows a typical video alert page of the video of the instant invention.

FIG. 15 shows a typical video alert page 523 of the video 255 of the instant invention. The instant invention uses Artificial Intelligence algorithm 247 or manual process to assemble the visual presentation 254 and the video 255. The typical video alert page 523 of the video 255 shown in FIG. 2 shows a picture of the client/patient 524 and information 525 that relates to the client/patient. The typical video alert page 523 also has a primary Tag 210.

Figure 16:
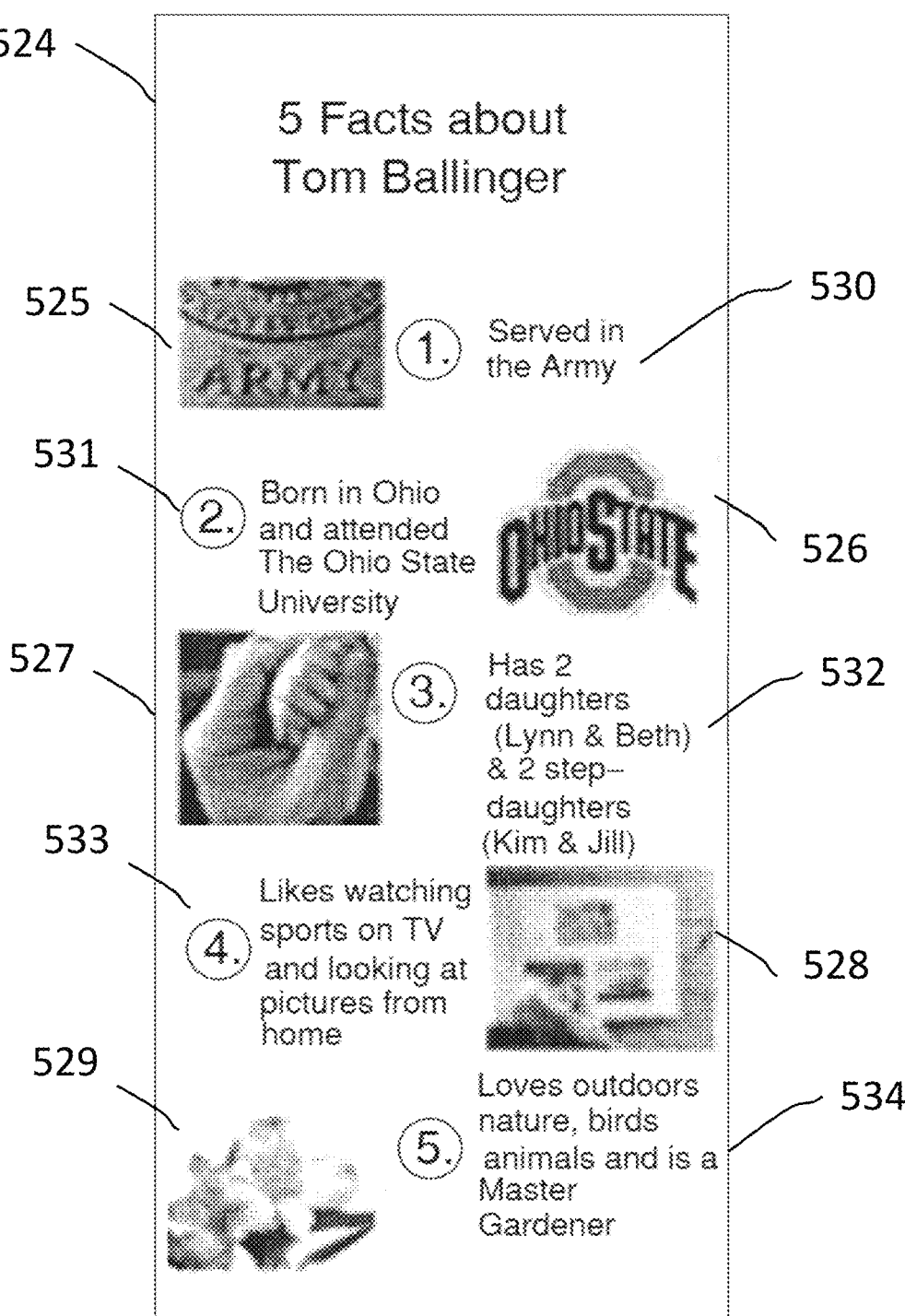
FIG. 16 shows a ninth alternative typical information page of the instant invention.

FIG. 16 shows a ninth alternative typical alternative information page 524 of the video 255 of the instant invention. The instant invention uses Artificial Intelligence algorithm 247 or manual process to assemble the visual presentation 254 and the video 255. The typical alternative information page 524 of the video 255 shown in FIG. 2 shows a picture related to the client/patient 525, 526, 527, 528 and 529 and information related to the client/patient 530, 531, 532, 533 and 534.

Figure 17:
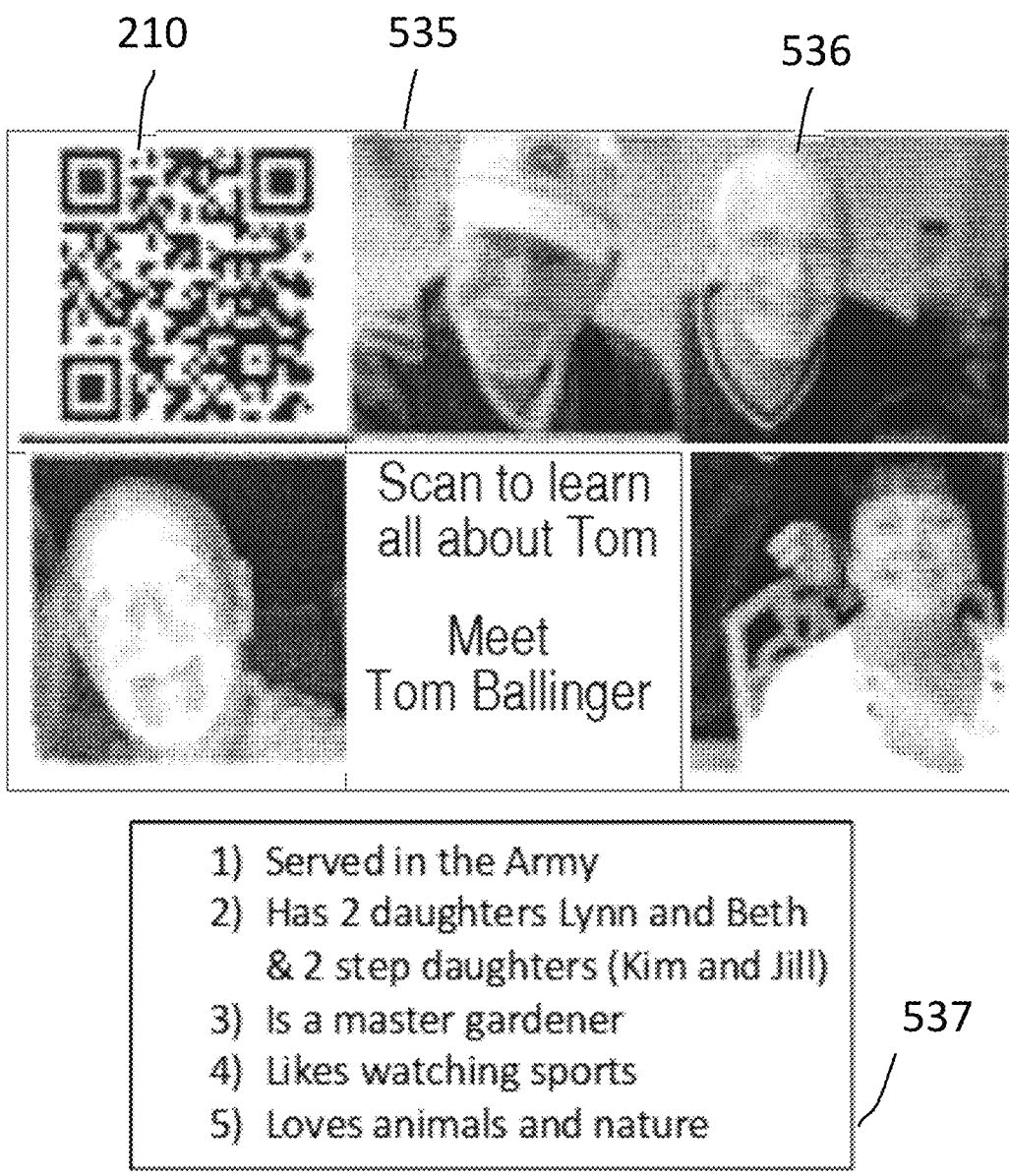
FIG. 17 is a typical client/patient at a glance information page.

FIG. 17 shows a typical client/patient at a glance information 535 of the video 255 of the instant invention shown in FIG. 2. The instant invention uses Artificial Intelligence algorithm 247 or manual process to assemble the visual presentation 254 and the video 255. The typical information page 535 of the video 255 shown in FIG. 2 shows primary Tag 210, a picture of the client/patient 536 and information 537 that relates to the client/patient.

Figure 18:
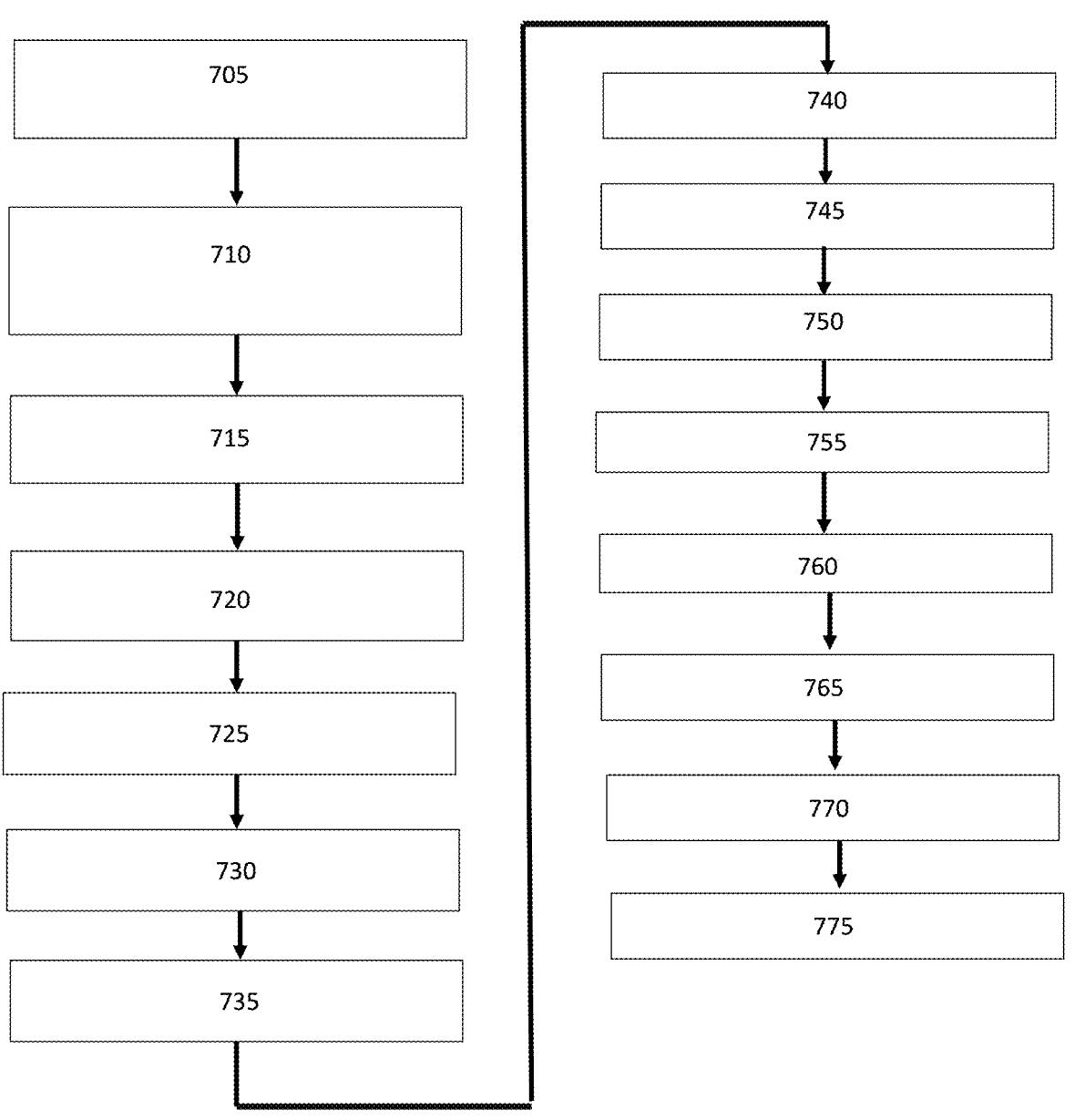
FIG. 18 shows an alternative embodiment flow chart of the instant invention.

An alternative embodiment of the instant invention as shown in FIG. 18 is a video compilation process utilizing at least one computer having an IP address comprising:

a. Step 705 the at least one computer sends an email with a family questionnaire and a request for patient pictures and patient videos;

b. Step 710 the at least one computer receives the questionnaire and patient pictures and patient videos from the family;

c. Step 715 the at least one computer using an artificial intelligence algorithm creates a visual presentation of the information and pictures;

d. Step 720 the at least one computer using the artificial intelligence algorithm creates a video of the visual presentation;

e. Step 725 the at least one computer using an artificial intelligence algorithm adds an audio track to the video and the audio track is comprised of music;

f. Step 730 the at least one computer creates a primary Tag and places it in the video;

g. Step 740 an administrator logs into a workstation in communication with the at least one computer using a secured login and password and the administrator creates a quiz and assigns the facility and location information, the secured login, password and the IP address to the video and assigns an award for completing the quiz to the video;

h. Step 745 the administrator creates a shared video from the video for an authorized individual and stores the shared file in a secure file sharing site and creates an access Tag that is associated with the shared video;

i. Step 750 the administrator shares access Tag with the authorized individual using an authorized user application on an authorized user mobile device scans the access Tag and views the shared video;

j. Step 755 the at least one computer uploads the video and the quiz to a cloud database;

k. Step 760 a caregiver uses a caregiver mobile device application on a caregiver mobile device and logs into the caregiver application using secure log in information and using the caregiver application to scan the primary Tag and the caregiver mobile device sends the primary Tag, the secure log in information and caregiver mobile IP address to the at least one computer and the at least one computer compares the secure log in information and the IP address of the video and if equal retrieves the video from the cloud database and displays it on the caregiver mobile device using the caregiver mobile device application;

l. Step 765 the caregiver reviews the video using caregiver mobile device application the caregiver mobile device;

m. Step 770 the caregiver takes the quiz and the caregiver mobile device application grades the quiz and displays the award; and n. Step 775 the administrator creates a shared file for an authorized individual such as a physician or therapist and stores the shared file in a secure file sharing site and creates a Tag that is associated with the file.

The instant invention can also use manual methods to assemble the video. When the video is assembled manually, the family communicates with the individual creating the video and provides them the answers to the questionnaire, videos, pictures and audio files so that the individual creating the video can place the content into the templates. The manual system uses a similar process as the automated process.

While the instant invention has been described as a system for creating a video to describe a patient in an assisted living facility the system can be utilized for real estate sales, auto sales, sales of luxury items, watercraft sales and vacation package presentations as well as other media compilation presentations. The flexibility of the artificial intelligence package provides the user the ability to customize the invention so that it can receive numerous formats of information and pair them together to form a single video which is available for viewing by selected individuals. The gamification aspect can also be used to incentivize real estate agents and sales agents in any field.

In some embodiments, the system, method or methods described above may be executed or carried out by a computing system including a tangible computer-readable storage medium, also described herein as a storage machine, that holds machine-readable instructions executable by a logic machine such as a processor or programmable control device to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, game controllers, video camera, camera, keyboard or gaming controller. For example, a user input may indicate a request that a certain task is to be executed by the computing system, such as requesting the computing system to display any of the above described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A video compilation process utilizing at least one computer having an IP address comprising:
   a. said at least one computer sends an email with a family questionnaire and a request for patient pictures and patient videos;
   b. said at least one computer receives said family questionnaire with patient information, said patient pictures and said patient videos from said family;
   c. said at least one computer, using an artificial intelligence algorithm, creates a visual presentation using said patient information and said patient pictures;
   d. said at least one computer, using said artificial intelligence algorithm, creates an information video of said visual presentation;
   e. said at least one computer, using said artificial intelligence algorithm, adds an audio track to said information video and said audio track is comprised of music;
   f. said at least one computer creates a primary Tag and places it in said information video;
   g. an administrator logs into a workstation in communication with said at least one computer using a secured login and password and said administrator creates a quiz and assigns a facility and location information, said secured login and password and said IP address to said information video and assigns an award for completing said quiz to said information video;
   h. said administrator creates a first shared video from said information video for an authorized individual and stores a first shared file containing said first shared video in a secure file sharing site and creates an access Tag that is associated with said first shared video, wherein said access Tag is attached to a patient's room or apartment;
   i. said administrator shares said access Tag with said authorized individual using an authorized user application on an authorized user mobile device and scans said access Tag attached to said patient's room or apartment and views said first shared video;

j. said at least one computer uploads said first shared video and said quiz to a cloud database;

k. a caregiver uses a caregiver mobile device application on a caregiver mobile device and logs into said caregiver application using secure login information and using said caregiver application to scan said primary Tag and said caregiver mobile device sends the primary Tag, said secure login information and caregiver mobile IP address to said at least one computer and said at least one computer compares said secure login information and said IP address of said video and if equal, retrieves said video from the cloud database and displays it on said caregiver mobile device using said caregiver mobile device application;

l. said caregiver reviews said video using said caregiver mobile device application on said caregiver mobile device;

m. said caregiver takes the quiz and said caregiver mobile device application grades said quiz and displays said award;

n. said administrator creates an authorized second shared file for said authorized individual selected from the group consisting of a physician and a therapist, and stores the authorized second shared file in said secure file sharing site and creates a Tag that is associated with said authorized second shared file; and o. said authorized individual access said authorized shared file.

2. The process of claim 1 wherein the primary Tag is selected from the group consisting of Quick Response code, barcode, Bluetooth tag, RFID tag, WIFI tag, NFC tag and Zigbee tag.

3. The process of claim 1 wherein the access Tag is selected from the group consisting of Quick Response code, barcode, Bluetooth tag, RFID tag, WIFI tag, NFC tag and Zigbee tag.

4. The process of claim 1 wherein a plurality of caregivers each take a plurality of quizzes, and wherein each caregiver of said plurality of caregivers is ranked based on the number of quizzes taken versus passed percentages.

5. The process of claim 4 wherein each caregiver of said plurality of caregivers is given said reward as various levels of test taken versus test passed is attained.

* * * * *